US006708433B1

(12) United States Patent
Falkner et al.

(10) Patent No.: US 6,708,433 B1
(45) Date of Patent: Mar. 23, 2004

(54) PORTABLE LIGHTED DISPLAY

(75) Inventors: Jason R. Falkner, Tampa, FL (US); Paul Lankford, Tampa, FL (US); Scott L. Biron, New Port Richey, FL (US)

(73) Assignee: Lighted Logos, L. C., Tampa, FL (US)

( * ) Notice: Subject to any disclaimer, the term of this patent is extended or adjusted under 35 U.S.C. 154(b) by 0 days.

(21) Appl. No.: 10/151,243

(22) Filed: May 21, 2002

(51) Int. Cl.$^7$ .............................. G09F 7/00; G09F 13/00; G09F 21/04
(52) U.S. Cl. ............................... 40/597; 40/552; 40/593
(58) Field of Search ........................... 40/591, 593, 597, 40/550, 551, 552, 559; 362/812; 248/205.5, 206.2, 206.3, 206.4, 363, 467

(56) References Cited

U.S. PATENT DOCUMENTS

| 2,277,981 | A | | 3/1942 | Horton |
| 2,623,315 | A | * | 12/1952 | Owen et al. ............... 40/552 |
| 2,895,245 | A | | 7/1959 | Spangler |
| 3,242,329 | A | | 3/1966 | Abrams |
| 3,755,943 | A | | 9/1973 | Cesarotti |
| 3,894,225 | A | | 7/1975 | Chao |
| 3,905,017 | A | | 9/1975 | Samra |
| 4,173,035 | A | | 10/1979 | Hoyt |
| 4,263,640 | A | | 4/1981 | Altman |
| 4,597,033 | A | | 6/1986 | Meggs et al. |
| 4,607,317 | A | | 8/1986 | Lin |
| 4,607,444 | A | | 8/1986 | Foster |
| 4,667,428 | A | | 5/1987 | Elmer |
| 4,890,529 | A | * | 1/1990 | Grant ........................ 84/291 |
| 4,970,812 | A | | 11/1990 | Tanaka et al. |

(List continued on next page.)

FOREIGN PATENT DOCUMENTS

EP 331224 * 10/1988 ................ 40/551

OTHER PUBLICATIONS

Neo–Neon™, "The World of Brightness", Lighting System Catalog 2001–2002, Duralight Series, 2 Wire Mini Fixing Duralight™, p. 33.
Neo–Neon™, "The World of Brightness", Lighting System Catalog 2001–2002, Duralight Series, 2 Wires Ultra–Brite Fixing Duralight™ 13mm, p. 53.
Neo–Neon™,"The World of Brightness", Lighting System Catalog 2001–2002, Duralight Series, 2 Wires Ultra–Brite Fixing Duralight™ 16mm, p. 54.
Neo–Neon™, "The World of Brightness", Lighting System Catalog 2001–2002, Duralight Series, Connecting System, pp. 55–56.
Neo–Neon™, "The World of Brightness ", Lighting System Catalog 2001–2002, Duralight Series, 2 Wires Ultra–Brite Flat Fixing Duralight™, p. 57.
Neo–Neon™, "The World of Brightness", Lighting System Catalog 2001–2002, Duralight Series, 3 Wire Bi–Color Duralight™ Series, p. 58.

(List continued on next page.)

Primary Examiner—Brian K. Green
(74) Attorney, Agent, or Firm—Banner & Witcoff, Ltd.

(57) ABSTRACT

A portable display unit is provided that illuminates a symbol formed by the unit. The display unit has a frame that forms an inner portion of the symbol and a backing sheet in the shape of the symbol that substantially covers the inner portion. The display unit further includes a rope light that surrounds the backing and thereby outlines the symbol. The rope light includes a power cord and a power connector for connecting to a power supply. The backing and display unit may have various colors to enhance the symbol or represent colors for the logo formed by the symbol. The display unit also includes hanging elements for removably attaching the unit to a support structure. In one embodiment, the hanging elements include suction cups for attaching the display unit to a window of a vehicle.

25 Claims, 6 Drawing Sheets

U.S. PATENT DOCUMENTS

| | | | |
|---|---|---|---|
| 4,976,057 A | | 12/1990 | Bianchi |
| 5,016,145 A | | 5/1991 | Singleton |
| 5,084,994 A | | 2/1992 | Elmer |
| 5,339,551 A | | 8/1994 | Elmer |
| 5,379,202 A | * | 1/1995 | Daun .......................... 362/252 |
| 5,534,315 A | | 7/1996 | Witte |
| 5,555,163 A | | 9/1996 | Pisani |
| 5,934,792 A | | 8/1999 | Camarota |
| 6,179,440 B1 | | 1/2001 | Palmer |
| 6,260,987 B1 | * | 7/2001 | Wu ............................ 362/252 |
| 6,347,471 B1 | | 2/2002 | Mirza |
| 6,375,143 B1 | * | 4/2002 | Burns .......................... 248/363 |
| 6,478,450 B1 | * | 11/2002 | Grajcar ....................... 362/249 |
| 2003/0204975 A1 | * | 11/2003 | Holder et al. ................. 40/552 |

OTHER PUBLICATIONS

Neo–Neon™, "The World of Brightness", Lighting System Catalog 2001–2002, Duralight Series, 3 Wires Bi–Color Flat Duralight Series, p. 59.

Neo–Neon™, "The World of Brightness", Lighting System Catalog 2001–2002, Duralight Series, LED Everlight Series, pp. 60–61.

Neo–Neon™, "The World of Brightness", Lighting System Catalog 2001–2002, Motif Series, Duralight™ Motif, p. 133.

Neo–Neon™, "The World of Brightness", Lighting System Catalog 2001–2002, Motif Series, Valentine's Motif, p. 134.

Neo–Neon™, "The World of Brightness", Lighting System Catalog 2001–2002, Motif Series, Halloween Motif, p. 135.

Neo–Neon™, "The World of Brightness", Lighting System Catalog 2001–2002, Motif Series, 2001 Millenium Motif, pp. 136, 139–140.

Neo–Neon™, "The World of Brightness", Lighting System Catalog 2001–2002, Motif Series, Gift Motif, p. 143.

Neo–Neon™, "The World of Brightness", Lighting System Catalog 2001–2002, Motif Series, Fancy Motif (GS) Dia. 13mm, p. 144–145.

Neo–Neon™, "The World of Brightness", Lighting System Catalog 2001–2002, Motif Series, 3–D Motif, p. 146.

Neo–Neon™, "The World of Brightness", Lighting System Catalog 2001–2002, Motif Series, Animated Motif, p. 147.

Neo–Neon™, "The World of Brightness", Lighting System Catalog 2001–2002, Motif Series, Portable Duralight™ Sign, p. 148.

Neo–Neon™, "The World of Brightness", Lighting System Catalog 2001–2002, Motif Series, Belt Light Motif, p. 149.

Neo–Neon™, "The World of Brightness", Lighting System Catalog 2001–2002, Motif Series, Play Light Moti Series, p. 150.

* cited by examiner

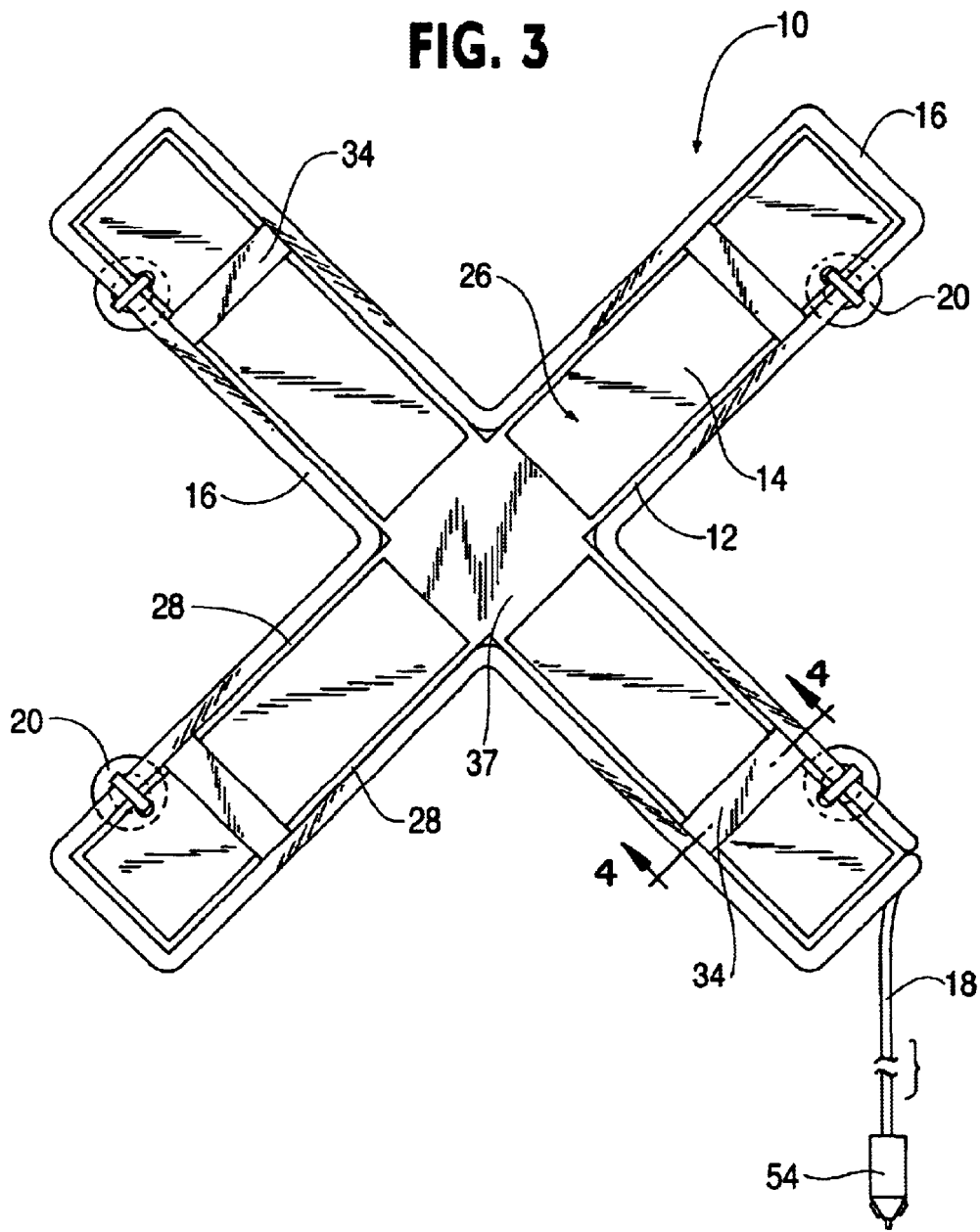

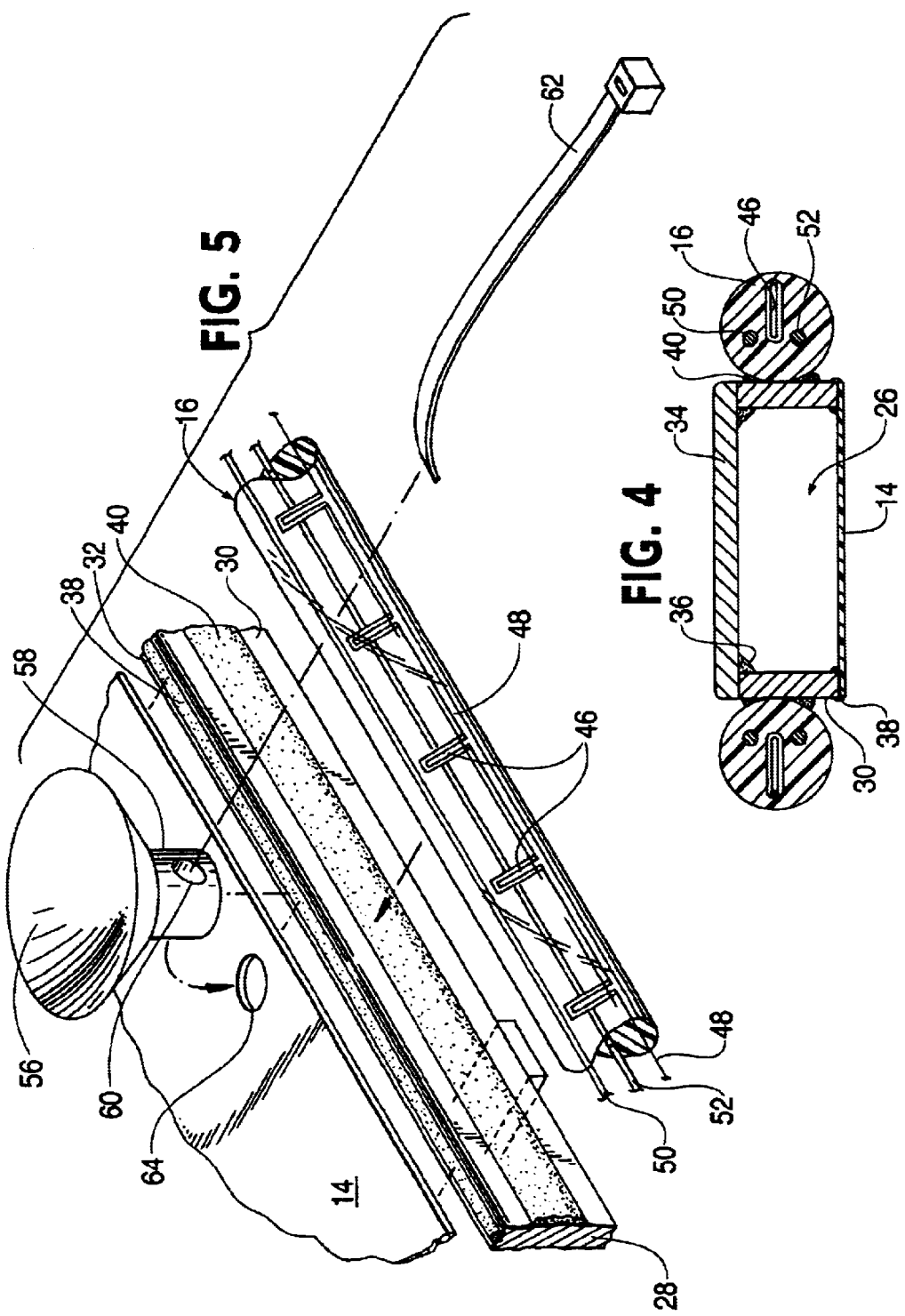

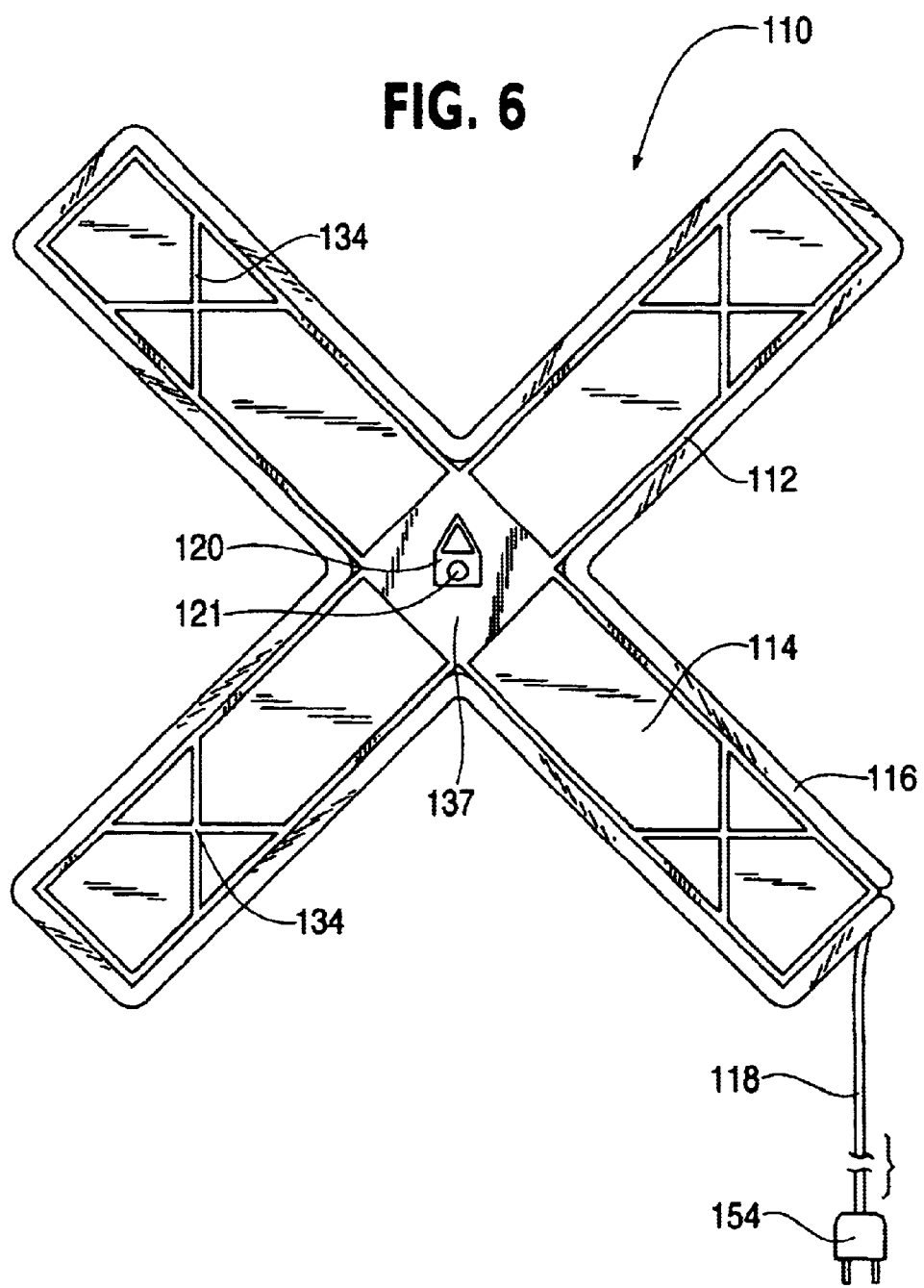

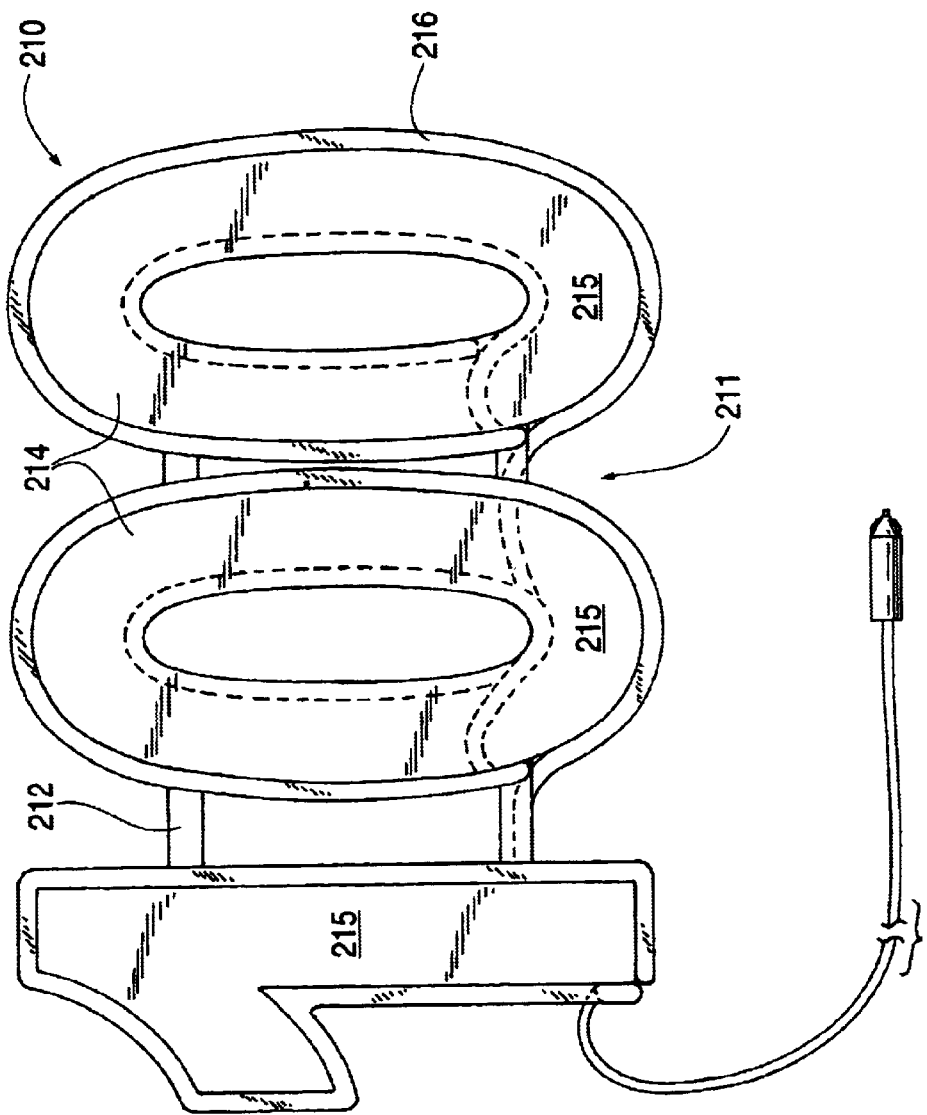

PORTABLE LIGHTED DISPLAY

FIELD OF THE INVENTION

This invention relates generally to lighted display units. More particularly, the present invention relates to a portable lighted display unit that is easily attachable and removable from a support surface.

BACKGROUND OF THE INVENTION

Display units that illuminate logos and other symbols are well known and come in a variety of shapes and sizes. For example, commercial signs have long used lights in various configurations to form symbols and to illuminate signs. Neon lights are a particular example of such commercial signs. Although neon lights prominently form symbols, they are expensive and are not well suited to portable displays because of their inability to absorb forces without breaking and their power requirements. As such, neon lights and similar lighted signs are typically permanently fixed to a support structure, such as a building. Less permanent signs are also known that illuminate symbols. These versions typically use strings of lights, such as those used for holiday lighting, in an arrangement to form symbols, logos, or decorative patterns. The strings of lights are commonly attached to support surfaces using semi-permanent attachment devices such as clips or hooks.

Portable lighted signs and symbols are also known. An example of a conventional portable illuminated symbol is a detachable vehicle sign, such as used by many pizza delivery drivers. These portable displays tend to use strings of lights or small light bulbs organized in a particular pattern. Strings of lights, however, tend to become tangled and are time consuming to hang and remove. Further, both strings of lights and light bulbs tend to burn out and require replacement of individual bulbs. In addition, the frames and attachment mechanisms for such systems are often bulky and heavy.

Improvements over neon lights, strings of lights, and other light bulb arrangements have been proposed for creating substantially permanent symbols and designs. These include rope lights hung in a manner similar to holiday lights, such as from a building. A rope light is a generally linear, flexible light unit that is particularly durable and which includes an elongated cylinder resembling a rope having lights embedded therein. The elongated cylinder is typically made of a flexible plastic material that is translucent or transparent. Conventional light units that use rope lights to form designs include rope lights attached to wire or another formative structure that retains the rope light in a particular shape. However, previous units have not provided mobile displays for taking advantage of the benefits of rope lights. Further, previous designs have used rope lights alone to form a particular linear symbol or design, rather than in conjunction with other display materials.

SUMMARY OF THE INVENTION

The present invention provides a portable display unit that forms a symbol using a backing material on a frame along with a rope light, and that accentuates the symbol by illuminating the rope light. The use of backing material along with rope lighting allows for the formation of symbols having more depth than rope lighting alone. The rope light enhances the symbol by illuminating the symbol display of the backing material and by emphasizing the outline of the symbol. Further, the rope light may display one color and the backing may display another color. Thus, for a symbol such as a university logo, the university colors may be represented between the rope light and the backing.

The portable display unit according to one embodiment includes a frame that defines an inner portion of a symbol, a backing substantially covering the inner portion, a rope light attached to the frame that is shaped to provide an outline of the symbol, a power cord connected to the rope light, and one or more hanging elements attached to the frame that are adapted to removably attach the unit to a structure. According to one aspect of the invention, the power cord includes a DC power connection for use with a vehicle power supply outlet. According to another aspect, the power cord includes an AC power connection for use with an AC power supply.

According to another aspect, the hanging elements include suction cups for attaching the display unit to a window of a vehicle. Such a display unit may be quickly and easily installed in a vehicle without complicated attachment mechanisms or without stringing lights. It may also be easily removed and placed out of view. According to another aspect, the hanging element includes a wall hanger for attaching to the wall of a building.

The portable display unit according to the present invention is lightweight and easy to manufacture. According to one embodiment, the frame is made of aluminum bars bent and welded to form a frame. According to another embodiment, the frame is made of injection molded plastic. In one aspect of the invention, the rope lights and backing may be attached to the frame using an adhesive. In other aspects, either or both the rope lights and backing may be attached to a frame using ties.

BRIEF DESCRIPTION OF THE DRAWINGS

The invention will be described in detail in the following description of preferred embodiments with reference to the following figures wherein:

FIG. 3 is a rear plan view of the display unit of FIG. 2;

FIG. 4 is a cross-sectional view taken through line 4—4 of FIG. 3;

FIG. 5 is an exploded view of the area 5 designated on FIG. 2;

FIG. 6 is a rear plan view of a display unit according to another embodiment of the invention; and FIG. 7 is a front plan view of a display unit according to a further embodiment of the invention.

DETAILED DESCRIPTION OF THE INVENTION

Figure 1:
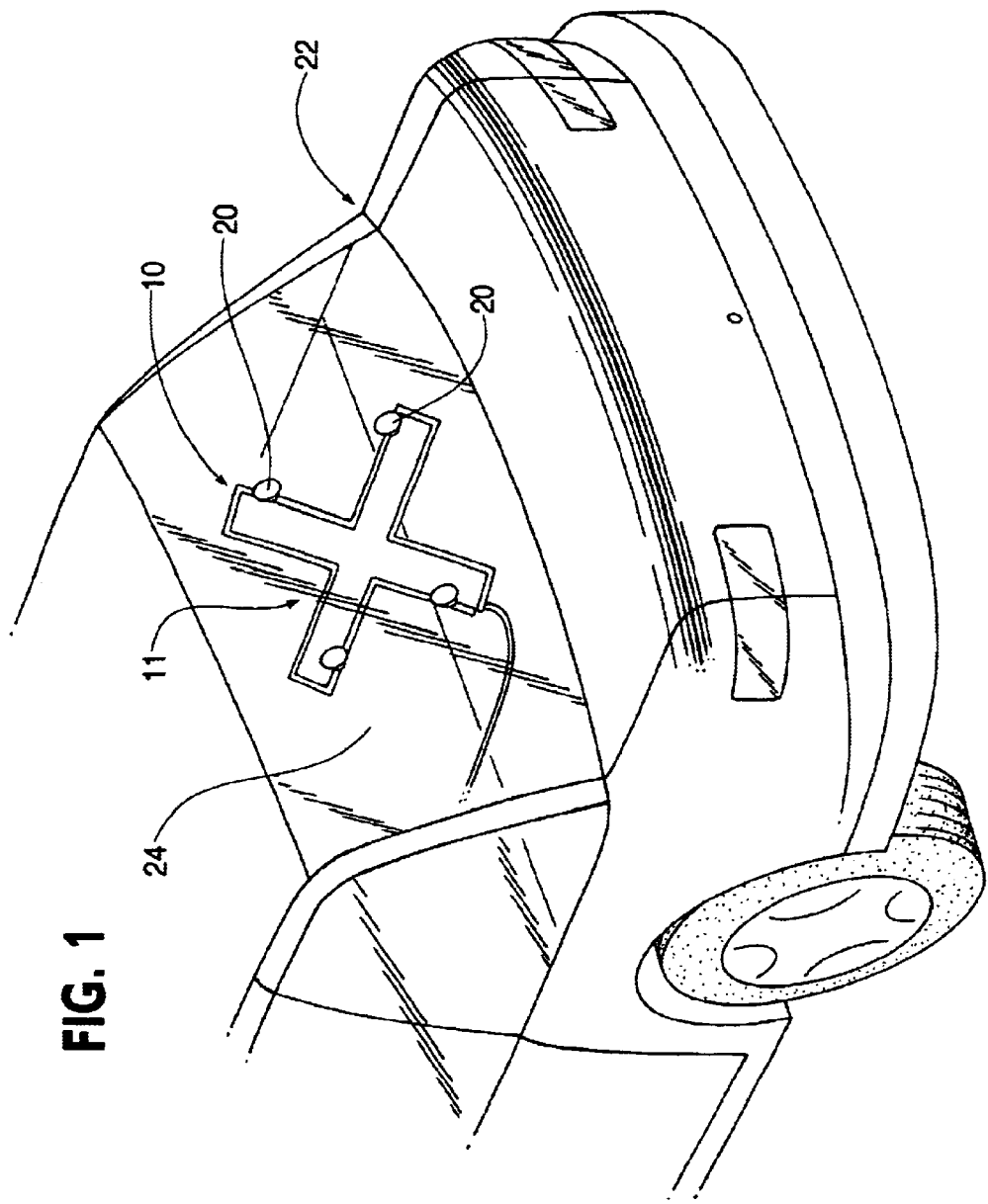
FIG. 1 is a perspective view of a display unit according to the present invention installed on a rear window of a vehicle.

The invention may be embodied in various forms. As shown in FIGS. 1–6, one embodiment according to the present invention includes a display unit 10 that generally includes a frame 12, a backing 14, an elongated flexible lighting strip (rope light) 16, a power cord 18, and a number of suction cups 20. The backing 14 is attached to frame 12 such that it covers frame 12 and preferably hides it from view. Backing 14 is shaped to form at least a portion of symbol 11, and is preferably in the shape of symbol 11. Symbol 11 in this example is the letter "X", which is the logo for hypothetical University X. Suppose that the colors for University X are blue and white. Accordingly, backing 14 may be an opaque white color that hides frame 12 from view. Rope light 16 is attached to the perimeter of frame 12 and outlines backing 14. Rope light 16 may have a blue tint matching the blue for University X. As such, when viewed from the front, the colors and logo of University X are represented by display unit 10, with frame 12 being hidden from view.

In addition to showing the logo for University X, display unit 10 further emphasizes the logo. To do so, rope light 16, which outlines the logo, may illuminate to emphasize the logo. Rope light 16 may be illuminated by connecting power cord 18 to a power supply, such as a DC power supply for the automobile 22 shown in FIG. 1. As shown, display unit 10 is adapted to connect to a window 24 of an automobile 22 via suction cups 20. The suction cups 20 are attached to frame 12 and permit display unit 10 to be easily attached to and removed from window 24.

Referring now to FIGS. 3–5, frame 12 defines an inner portion 26 of the logo symbol, which is at least partially covered by backing 14. Frame 12 according to this embodiment is formed by a rectangular bar 28 having a perimeter surface 30 and a frontal surface 32. Each of these surfaces 30, 32 are preferably flat. They could, however, be contoured or have other shapes. For example, perimeter surface 30 may be concave to mate with rope light 16. The bar is preferably made of metal, and is more preferably made of aluminum, which is desirable for relatively light weight and its high strength characteristics. As discussed later with regard to another embodiment, frame 12 may be made of other materials, such as plastic. In this embodiment, rectangular bar 28 is bent to form the shape of the desired logo X and to define inner portion 26. Frame 12 may be formed from multiple bars 28 joined together or from a single bar, and the bar or bars may be welded to retain the desired frame shape.

To provide rigidity and reinforce the desired shape, frame 12 may include support members 34 that span across inner portion 26. As shown in FIG. 4, support members 34 may be welded to frame 12 via welds 36. Frame 12 may further include a central support member 37 for further support.

Figure 2:
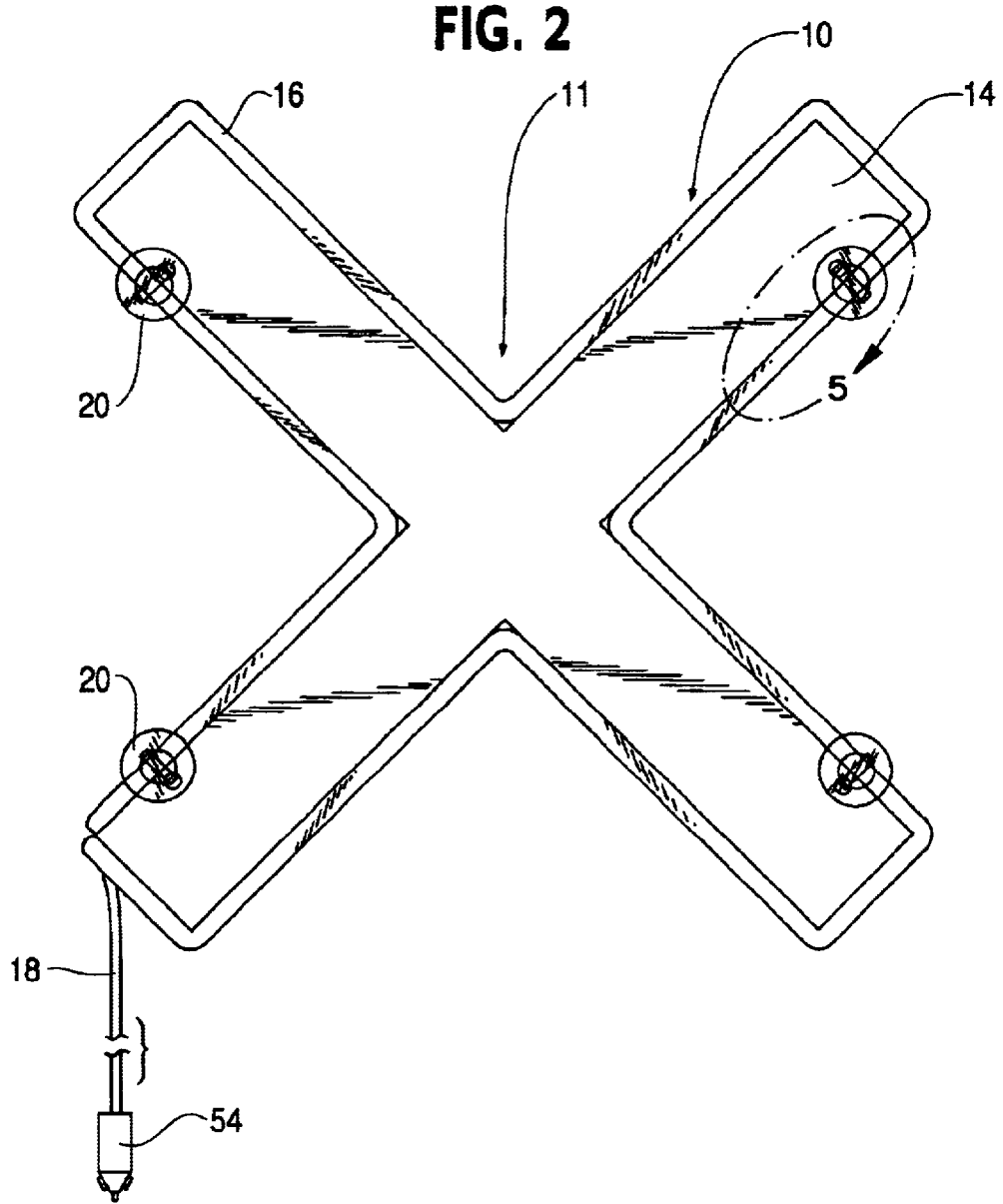
FIG. 2 is a front plan view of the display unit of FIG. 1 shown detached from the vehicle.

Backing 14 is attached to front surface 32 of frame 12 and covers inner portion 26. Adhesive 38 attaches backing 14 to frame 12. Backing 14, however, may be attached through various alternative devices or techniques, such as through ties. Backing 14 is preferably made from a plastic sheet material, such as LEXAN®, and is preferably opaque. As an opaque material, backing 14 hides frame 12 from being viewed from the front side of display unit 10, as shown in FIG. 2. Further, the opaque material may have a desirable color for the logo formed by the unit. It may further be painted or otherwise decorated. The backing material may also be translucent or partially translucent, such that it may be illuminated from a light source located behind backing 14, which alternative is discussed below in relation to another embodiment. The backing material may further be tinted to include a desired color.

Rope light 16 is attached to perimeter surface 30 of frame 12. An adhesive 40 is preferably used to attach rope light 16 to perimeter surface 30. Ties or other attachment devices may alternatively be used to attach rope light 16 to perimeter surface 30. As attached, rope light 16 outlines frame 12 and thereby outlines the logo. Rope light 16 is formed from a flexible cylinder 42. Disposed along the length of cylinder 42 is a series of miniature lights 46 connected by a wire 48 to form a string 44 of lights. Miniature lights 46 may all be the same color or there may be a mix of colored lights. One end of the string of lights 44 is connected to a positive wire 50 and the opposite end is connected to a negative wire 52. Positive wire 50 and negative wire 52 are connected to power cord 18. When connected to an electric power source, current flows through the string of lights 44, which thereby illuminate cylinder 42. Cylinder 42 is preferably transparent and has a tint of a desired color. As string of lights 44 glows, cylinder 42 is illuminated according to the tint of the cylinder. Thus, when connected to a power source, rope light 16 illuminates the outline of the logo in the color desired.

One end of rope light 16 is attached to power cord 18, which includes a DC power connector 54. As discussed below with relation to another embodiment, power connector 54 may be adapted to connect to an AC power supply. In this embodiment, DC power connector 54 is adapted to be received by a vehicle DC power outlet (not shown), such as cigarette lighter outlet. Accordingly, display unit 10 may easily be connected and disconnected from such a power outlet.

Suction cups 20 are attached to frame 12 preferably via flexible ties 62. As shown in FIG. 5, each suction cup 20 has an attachment end 56 and a body 58 extending away from the attachment end 56. The body 58 defines a hole 60 therethrough for attachment to frame 12 via ties 62 or similar connectors. Ties 62 preferably include conventional plastic ties, but may include wire ties or similar connectors. To attach each suction cup 20, a tie 62 extends through hole 60 and around a rectangular bar 28 of frame 12. Each tie 62 may extend through an opening 64 formed through backing 14. Accordingly, each suction cup is attached to frame 12 with body 58 against a rectangular bar 28 and attachment end 56 extending outward from frame 12.

To avoid obstructing the view of the logo, suction cups 20 and ties 64 are preferably transparent or translucent. Suction cups 20 are preferably made of a rubberized plastic, which provides an airtight seal against glass or another smooth surface. Ties 64 are preferably made of a flexible plastic material that firmly holds respective suction cups 20 in position. The use of ties 64 also permits the suction cups 20 to be rotated around the frame at an angle desirable for attaching the unit to a particular surface. They may also be rotated to attach the unit 10 to a surface from an opposite side. For example, it may be necessary to attach unit 10 on the outside of a vehicle window 24 of FIG. 1, as opposed to the inside of vehicle window 24. Rotation of suction cups 20 allows such attachment flexibility, yet provides firm connection to a window 24 or other smooth surface. Suction cups 20 operate as conventional suction cups to removably, yet securely, attach unit 10 to window 24.

In operation, display unit 10 provides a logo or symbol 11 that is highly visible in either daylight or at night. The backing 14 forms the shape of the logo or symbol 11 and is particularly prominent in daylight. Rope light 16 outlines backing 14 to reinforce the shape formed by backing 14. At times of reduced light, such as at night, rope light 16 makes the display unit 10 highly visible. The light from rope light 16 forms a clear outline of the desired logo or symbol 11 and also serves to illuminate backing 14. Backing 14 and rope light 16 thereby enhance one another to create a highly visible display of symbol 11 in light or darkness.

Further, display unit 10 is easy to install and remove from a display location. As shown in FIG. 1, display unit 10 may be easily attached to a window 24 of a vehicle by simply pushing suction cups 20 against window 24. As desired, display unit 10 may be illuminated by connecting DC power connector 54 to a DC outlet (not shown). Power cord 18 or power connector 54 may include a switch (not shown) for selectively turning rope light 16 on and off. Display unit 10 may be removed by unplugging power connector 54 from the outlet and removing it from window 24. It may be removed by squeezing suction cups 20 to break the vacuum formed between each suction cup 20 and window 24.

Display unit 10 is easy to manufacture as well as to use. Display unit 10 may be made, according to one embodiment, by forming frame 12 into an outline shape of symbol 11, gluing rope light 16 to perimeter surface 30 of the frame, gluing backing 14 to front surface 32 of frame 12, and attaching suction cups 20 to frame 12 using ties 62. Rope light 16 may alternatively be attached to perimeter surface 30 using ties, which are preferably transparent or translucent. Frame 12 may be formed by bending metal bar 28 or multiple bars into the shape of logo 11 and welding metal bar 28 to retain its shape. Supports 34 may also be welded to the metal bar 28. By using pre-formed frames, such as a plastic frame injection molded into a desired shape, the manufacturing process may be further simplified. Such an embodiment is discussed hereafter.

Referring now to FIG. 6, a display unit 110 according to another embodiment of the present invention is shown. Display unit 110 makes use of an injection molded plastic frame 112, and is adapted is attach to a wall of a building and to connect to a conventional AC power outlet. Except for aspects and features related to its attachment, its frame, and its power supply, all other aspects and features of display unit 110 are the same as display unit 10.

Display unit 110 generally includes a plastic frame 112, a backing 114, a rope light 116, a power cord 118, and a hanger 120. Frame 112 is preferably injection molded into its desired shape and includes support members 134 and a central support 137. Support members 134 add rigidity and strength to frame 112. Central support 137 further strengthens frame 112 and provides an attachment location for hanger 120. Hanger 120 is preferably attached to central support 137 via a screw 121. Hanger 120 is preferably a conventional picture hanger, such as an eye-type picture hanger. However, hanger 120 could be another type of hanger or could simply be a hole formed through central support 137. Hanger 120 is adapted to receive a nail head for hanging display unit 110 on a wall (not shown) of a building.

Although not shown in this embodiment, other hanging elements, such as suction cups, may be used as an alternative to hanger 120. Further, other hanging elements like suction cups may be included along with hanger 120, thus providing the option of hanging display unit 110 on either a wall or a smooth surface like a window. Power cord 118 preferably includes an AC power connector 154 that is adapted to be received by a conventional AC power outlet (not shown).

Referring now to FIG. 7, a display unit 210 according to a further embodiment of the present invention is shown. Display unit 210 forms a numeric symbol 211 and is adapted to be connected to a vehicle window (not shown). The backing 214 in this embodiment is illuminated from behind along inner portions of numeric symbol 211. Except for aspects and features related to symbol 211 and illuminating backing 214 from behind, other aspects and features are the same as display unit 10. The backing 214 of display unit 210 includes a plurality of backing segments 215, which each form a portion of symbol 211. Suppose for example that display unit 210 represents the number "100" for a racecar. As such, symbol 211 is the number "100" and backing segments 215 each form a portion of symbol 211.

Rope light 216 surrounds the perimeter of each backing segment 215 to form the outline of symbol 211. Rope light 216 shown in FIG. 7 is a single, continuous rope light that is routed behind portions of frame 212. However, multiple rope lights may be used to outline symbol 211 including rope lights of different colors. As shown in FIG. 7, rope light 216 may be routed behind portions of backing 214 to further illuminate backing 214. In this example, the inner portions of the zeros in the number "100" of symbol 211 are illuminated at their edges from behind. To enhance such illumination, backing segments 215 are preferably translucent or semi-transparent and have tints for desired colors. Accordingly, when rope light 216 is illuminated, it outlines symbol 211 and further illuminates backing 214.

While the present invention has been described in connection with the illustrated embodiments, it will appreciated and understood that modifications may be made without departing from the true spirit and scope of the invention. In particular, various shapes and sizes of symbols and logos may be formed. Additionally, multiple rope lights having the same or different colors may used and the backing may include multiple backing segments. Further, the display unit may be attached in a variety of ways and may be made from a variety of materials.

We claim:

1. A portable display unit adapted to illuminate a symbol formed by the unit, said unit comprising:
   a frame defining an inner portion of said symbol;
   a backing substantially covering said inner portion, said backing connected to said frame and forming at least a portion of said symbol;
   at least one rope light attached to said frame and shaped to provide an outline of at least a portion of said symbol;
   a power cord connected to said at least one rope light;
   a suction cup attached to said frame and adapted to removably attach said unit to a structure; and
   a tie attaching said suction cup to said frame and enabling said suction cup to be rotated about said frame.

2. The display unit of claim 1, wherein said backing comprises at least one opaque plastic sheet.

3. The display unit of claim 1, wherein said backing comprises at least one tinted, partially translucent, plastic sheet.

4. The display unit of claim 1, wherein said at least one rope light comprises a substantially transparent, flexible, cylinder having lights disposed therein.

5. The display unit of claim 1, wherein said backing comprises a tinted, partially translucent plastic sheet having a tint of a first color, and said at least one rope light comprises a tinted, substantially transparent, flexible cylinder having a tint of a second color.

6. The display unit of claim 1, wherein said display unit represents a two color logo of a known university comprising a first color and a second color, said backing comprises a plastic sheet having a color of one of said first and second colors, and said rope light comprises a cylinder having a color of the other of one of said first and second colors.

7. The display unit of claim 1, wherein said suction cup defines a hole formed therethrough and said tie extends through said hole.

8. The display unit of claim 1, wherein said tie is substantially transparent.

9. The display unit of claim 1, further comprising a transparent attachment means for attaching said rope light to said frame.

10. The display unit of claim 9, wherein said transparent attachment means comprises at least one substantially transparent tie.

11. The display unit of claim 1, wherein said frame comprises at least one substantially rectangular bar bent to form at least a portion of said symbol.

12. The display unit of claim 11, wherein said bar has a substantially flat perimeter surface and said rope light is attached to said substantially flat perimeter surface.

13. The display unit of claim 11, wherein said bar is made of aluminum.

14. The display unit of claim 11, wherein said bar is made of plastic.

15. The display unit of claim 1, wherein said frame comprises a plurality of support members extending between portions of said frame and disposed within said inner portion of the symbol.

16. The display unit of claim 1, wherein said power cord comprises a DC power connector.

17. The display unit of claim 1, wherein said power cord comprises an AC power connector.

18. A portable vehicle display unit adapted to illuminate a symbol formed by the unit and adapted to attach to a window of a vehicle, said unit comprising:
   a frame defining an inner portion of said symbol;
   a backing covering said inner portion, said backing connected to said frame and forming at least a portion of said symbol;
   at least one rope light attached to said frame and shaped to provide an outline of at least a portion of said symbol;
   a DC power cord connected to said at least one rope light having a DC power connector at one end, said DC power connector adapted to mate with a power outlet of said vehicle;
   a plurality of suction cups attached to said frame and adapted to removably attach to said window of the vehicle; and
   a plurality of suction cup ties, each suction cup tie attaching a respective one of said suction cups to said frame and enabling said respective suction cup to be rotated about said frame.

19. The display unit of claim 18, wherein each said suction cup defines a hole formed therethrough and said respective tie extends through said hole.

20. A portable vehicle display unit adapted to illuminate a symbol formed by the unit, said unit comprising:
   a frame defining an inner portion of said symbol, said frame having a substantially flat perimeter surface and a substantially flat front surface;
   at least one plastic sheet covering said inner portion, said at least one plastic sheet attached to said frame along said substantially flat front surface;
   a rope light attached to said frame along said substantially flat outer perimeter surface;
   at least one adhesive attaching said at least one plastic sheet to said frame and attaching said rope light to said frame;
   a DC power cord connected to said at least one rope light having a DC power connector at one end;
   a plurality of suction cups attached to said frame and adapted to removably attach said unit to a window of a vehicle, each said suction cup defining a hole formed therethrough; and
   a plurality of ties, each said tie extending through said suction cup hole of a respective one of the suction cups and attaching said respective one of the suction cups to said frame.

21. A portable display unit for representing a logo of a university, said display unit comprising:
   a frame;
   a rope light coupled to said frame and outlining an interior portion of said logo, said rope light having a first color of said logo;
   a backing substantially covering said interior portion and coupled to said rope light, said backing having a second color of said logo;
   a suction cup attached to said frame and adapted to removably attach said unit to a structure; and
   a tie attaching said suction cup to said frame and enabling said suction cup to be rotated about said frame.

22. The display unit of claim 21, wherein said suction cup defines a hole formed therethrough and said tie extends through said hole.

23. The display unit of claim 21, wherein said tie is substantially transparent.

24. The display unit of claim 21, wherein said backing comprises at least one opaque plastic sheet.

25. The display unit of claim 21, wherein said backing comprises at least one tinted, partially translucent, plastic sheet.

* * * * *